Jan. 1, 1957  A. K. BILLMEYER  2,775,951
DEVICE FOR INDICATING THE POSITION OF NON-BUOYANT OBJECTS
Filed July 3, 1952
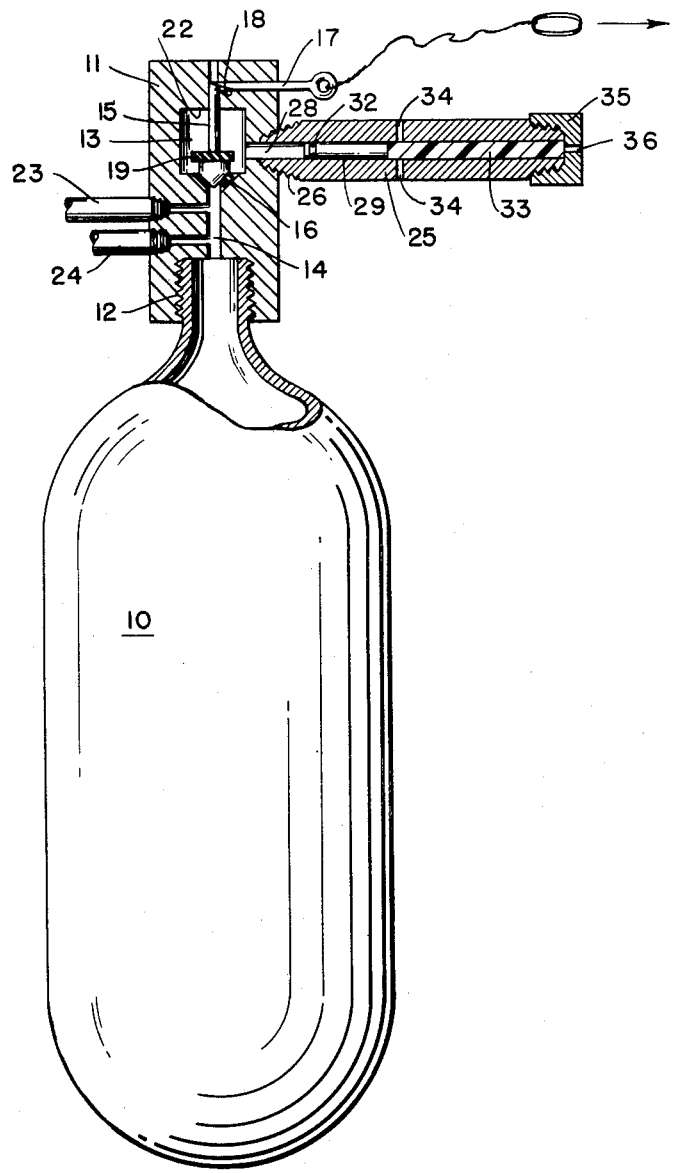
INVENTOR.
ALLEN K. BILLMEYER
BY G. D. O'Brien
E. C. Walsh
ATTORNEYS

United States Patent Office 2,775,951
Patented Jan. 1, 1957

2,775,951

DEVICE FOR INDICATING THE POSITION OF NON-BUOYANT OBJECTS

Allen K. Billmeyer, Covina, Calif., assignor to the United States of America as represented by the Secretary of the Navy Application July 3, 1952, Serial No. 297,195

1 Claim. (Cl. 116—124)

(Granted under Title 35, U. S. Code (1952), sec. 266)

The invention described herein may be manufactured and used by or for the Government of the United States of America for governmental purposes without the payment of any royalties thereon on therefor.

This invention relates to apparatus for indicating the location of submerged non-buoyant articles; more particularly, it relates to apparatus for indicating the location of submerged test missiles.

Underwater ordnance experimentation requires extensive launching of missiles for test purposes. The missiles are often launched in deep water in lakes or other bodies of water where they become imbedded in deep mud on the bottom. As these missiles are often quite expensive and as their recovery is necessary for the evaluation of results, the problem of locating them on the bottom becomes important.

Various expedients such as dyes, noise sources, ejection of tie-lines, floats and the magnetometer have been used in the past for the location of test missiles. Without exception, none of these expedients operate successfully when the missile becomes embedded in mud. Further, they will not operate consistently under other conditions. In addition, forces accompanying launching create problems of construction in making them sufficiently rugged which make their use questionable.

It is, therefore, an object of this invention to provide apparatus for locating non-buoyant submerged missiles which will indicate their position below the surface when they are embedded in mud.

It is another object of this invention to provide apparatus for indicating the location of submerged missiles so constructed that it will withstand launching forces.

The invention is best understood by reference to the accompanying drawing, hereby made a part of this specification, in which is shown a vertical cross-section of the apparatus of the invention.

At 10 there is shown a compressed air flask which may be either an integral part of the apparatus or may be the air flask of a torpedo or other underwater missile. The valve block or housing 11 is threadedly attached to the air flask as shown at 12. If it is desired to attach the valve block to the air flask of a missile, the end for attachment may be made in the form of a male screw. The valve block contains the poppet valve chamber 13 which is in communication with the air flask by channel 14. Poppet valve 15 for confining the compressed air in the flask is seated in rubber gasket 16 and is locked in place by lanyard pin 17 which is provided with a sloping face 18 to permit locking of the poppet valve in place. Other conventional seating construction may be used as well as other conventional means for locking the valve in place. The upper face of the poppet valve should be provided with a seating device 19 such as a rubber gasket so that it will seat against the upper wall 22 of the poppet valve chamber in airtight arrangement. The valve block is provided with charging valve 23 and safety valve 24, both in communication with channel 14. The delay valve body 25 is threadedly engaged to the valve block at 26. The delay valve body is provided with piston chamber 28 communicating with valve chamber 13. The piston chamber is provided with a slideable piston 29 which blocks the escape of air from the valve chamber when in the locked position. This piston is provided with an O-ring 32, or other means for preventing the escape of air from the valve chamber. An extrusible material 33, such as molding clay, plastic or other similar material, is placed in the forward end of the piston chamber to hold the piston in locked position so that the air outlet ports 34 are closed when the poppet valve 15 is in closed position. The valve body is provided with a detachable end plug 35 which has extrusion orifice 36 for the outlet of extrusible material. This orifice, as well as outlet ports 34, may be constructed with adjustments for regulating the escape of plastic and air, respectively, through them. The complete apparatus, including air flask may be enclosed in the housing of the torpedo or other underwater missile which is being tested.

In operation, the lanyard pin 17 is automatically pulled when the missile is launched, thus releasing poppet valve 13 and permitting compressed air to force extrusible material 33 through orifice 36 until piston 29 has passed beyond ports 34, thus permitting the air to rise in bubbles to the surface to form a pattern thereon which is easily discernible.

An advantage of the apparatus is that its simplicity of construction and operation permit a rugged construction which will withstand launching forces.

A further advantage is the fact that the apparatus will operate efficiently and consistently when the missile is submerged in mud, in contrast to prior devices which have been used.

While there has been disclosed a preferred embodiment of the invention, it is obvious that many modifications and variations are possible in the light of the above teachings. It is, therefore, to be understood that within the scope of the appended claim, the invention may be practiced otherwise than as specifically described.

What is claimed is:

Apparatus for effecting the time delayed release of pressurized gas, comprising a pressure flask having an associated normally closed but selectively openable outlet valve, a valve housing for said outlet valve having a passage therein communicating at one end with the interior of the flask when said valve is open, said housing having a port communicating said passage to the exterior of the housing at a point intermediate the length of the passage, a movable piston sealingly engaging the wall of the passage and normally disposed between said one end of the passage and said port, extrudible material filling that portion of the passage on the side of the piston remote from said one end of the passage, said housing having an orifice communicating the other end of the passage to the exterior of the housing, said orifice being of predetermined reduced cross-sectional area relative to the cross-sectional area of said passage, the arrangement being such that the extrusion of said material through the orifice under the force of pressurized gas acting on the piston will delay for a predetermined period of time the movement of the piston to a position wherein said port is communicated with said one end of the passage.

References Cited in the file of this patent

UNITED STATES PATENTS

| 1,120,417 | Smith | Dec. 8, 1914 |
| 1,803,530 | King et al. | May 5, 1931 |

FOREIGN PATENTS

| 7,023 | Holland | Mar. 8, 1922 |